(12) United States Patent
Yu et al.

(10) Patent No.: US 9,123,917 B2
(45) Date of Patent: Sep. 1, 2015

(54) FLAT TUBULAR OR PLATE TYPE SOLID OXIDE FUEL CELL

(75) Inventors: Ji-Haeng Yu, Daejeon (KR); Hee-Lak Lee, Daejeon (KR); In-Sub Han, Chungcheongnam-do (KR); Doo-Won Seo, Daejeon (KR); Kee-Seog Hong, Daejeon (KR); Se-Young Kim, Gyeonggi-do (KR); Sang-Kuk Woo, Daejeon (KR); Sun-Dong Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 335 days.

(21) Appl. No.: 13/993,527

(22) PCT Filed: Dec. 16, 2011

(86) PCT No.: PCT/KR2011/009734
§ 371 (c)(1),
(2), (4) Date: Jun. 12, 2013

(87) PCT Pub. No.: WO2012/081936
PCT Pub. Date: Jun. 21, 2012

(65) Prior Publication Data
US 2013/0273451 A1 Oct. 17, 2013

(30) Foreign Application Priority Data
Dec. 16, 2010 (KR) .................. 10-2010-0129331

(51) Int. Cl.
*H01M 8/02* (2006.01)
*H01M 8/12* (2006.01)
*H01M 8/24* (2006.01)

(52) U.S. Cl.
CPC .......... *H01M 8/0202* (2013.01); *H01M 8/0297* (2013.01); *H01M 8/1213* (2013.01); *H01M 8/243* (2013.01); *Y02E 60/521* (2013.01); *Y02E 60/525* (2013.01)

(58) Field of Classification Search
None
See application file for complete search history.

(56) References Cited

U.S. PATENT DOCUMENTS
2009/0169958 A1   7/2009   Lin

FOREIGN PATENT DOCUMENTS
JP        2009-266483 A     11/2009
KR   10-2009-0106564 A     10/2009
WO       2008143657 A1     11/2008

OTHER PUBLICATIONS
Zhou et al., "High performance composite interconnect La0.7Ca0.3CrO3/20 mol% ReO1.5 doped CeO2 (Re=Sm, Gd, Y) for solid oxide fuel cells," J. Power Sources 164 (2007), 293-299.*
Machine translation of JP 2009-266843, Nov. 2009.*

* cited by examiner

*Primary Examiner* — Jonathan Crepeau
(74) *Attorney, Agent, or Firm* — Enshan Hong; VLP Law Group LLP (57) ABSTRACT

The present invention relates to a solid oxide fuel cell, which includes a plurality of unit cells and a connection layer between the plurality of unit cells, wherein each of the unit cells includes an anode, a cathode and a solid electrolyte between the anode and the cathode, and the connection layer includes i) a first layer containing La-ferrite including one or more selected from the group consisting of Sr, Ca and Ba; and ii) a second layer containing La-ferrite including one or more selected from the group consisting of Sr, Ca and Ba, and one or more cerias selected from the group consisting of GDC (Gd doped ceria), LDC (La-doped ceria) and SDC (Sm-doped ceria), wherein the first layer is in contact with the cathode of each of the unit cells and the second layer is in contact with the anode of each of the unit cells.

4 Claims, 7 Drawing Sheets

FLAT TUBULAR OR PLATE TYPE SOLID OXIDE FUEL CELL

TECHNICAL FIELD

The present invention relates to a flat tubular or plate type solid oxide fuel cell. This application claims the benefit of Korean Patent Application No. 10-2010-0129331, filed Dec. 16, 2010, which is hereby incorporated by reference in its entirety into this application.

BACKGROUND ART

Each unit cell of a solid oxide fuel cell (SOFC) includes an electrolyte having oxygen ion conductivity and an anode and a cathode disposed on both surfaces thereof. When oxygen and hydrogen are supplied to respective electrodes, the oxygen ion produced by a reduction reaction of oxygen at the cathode is transported to the cathode through the electrolyte and then reacts with hydrogen supplied to the anode, thus forming water. As such, in the course of the electrons produced at the anode being transported to the cathode and consumed, the electrons flow to external circuits, thereby producing electric energy.

The unit cells are connected by means of a connector. More specifically, the connector typically functions to electrically connect the anode of one cell and the cathode of a neighboring cell to each other. Also, the connector should play a role in physically preventing mixing between air gas supplied to the anode and fuel gas supplied to the cathode. As the connector, a metal connector and a ceramic connector are mainly used.

The ceramic connector has good mechanical properties at high temperature, but is not dense, so gas may leak, a reaction with an electrode may occur, or stripping from an electrode may take place during operation of the fuel cell.

DISCLOSURE

Technical Problem

An object of the present invention is to provide a solid oxide fuel cell, which includes a connection layer that is composed of a dense film so as to prevent leakage of gas.

Another object of the present invention is to provide a solid oxide fuel cell, which includes a connection layer that may be densely applied on a porous electrode.

Still another object of the present invention is to provide a solid oxide fuel cell, which includes a connection layer that does not react with an electrode.

Yet another object of the present invention is to provide a solid oxide fuel cell, which includes a connection layer that is not stripped from an electrode during operation of the fuel cell.

Technical Solution

The present invention provides a solid oxide fuel cell, comprising a plurality of unit cells; and a connection layer between the plurality of unit cells, wherein each of the unit cells comprises an anode; a cathode; and a solid electrolyte between the anode and the cathode, and the connection layer comprises i) a first layer containing La-ferrite including one or more selected from the group consisting of Sr, Ca and Ba; and ii) a second layer containing La-ferrite including one or more selected from the group consisting of Sr, Ca and Ba, and one or more cerias selected from the group consisting of GDC (Gd doped ceria), LDC (La-doped ceria) and SDC (Sm-doped ceria), wherein the first layer is in contact with the cathode of each of the unit cells, and the second layer is in contact with the anode of each of the unit cells.

Advantageous Effects

According to the present invention, the connection layer of a solid oxide fuel cell is composed of a dense film so as to prevent leakage of gas, and can be densely applied on a porous electrode. The connection layer of the solid oxide fuel cell according to the present invention does not react with an electrode, and is not stripped from an electrode during the operation of the fuel cell. The connection layer of the solid oxide fuel cell according to the present invention has sufficient conductivity, so that the unit cells are electrically connected to each other.

MODE FOR INVENTION

Hereinafter, a detailed description will be given of preferred embodiments of the present invention which may be easily performed by those skilled in the art, with reference to the appended drawings.

According to the present invention, a solid oxide fuel cell includes a plurality of unit cells and a connection layer between the unit cells, wherein each of the unit cells includes an anode, a cathode, and a solid electrolyte between the anode and the cathode.

Figure 1:
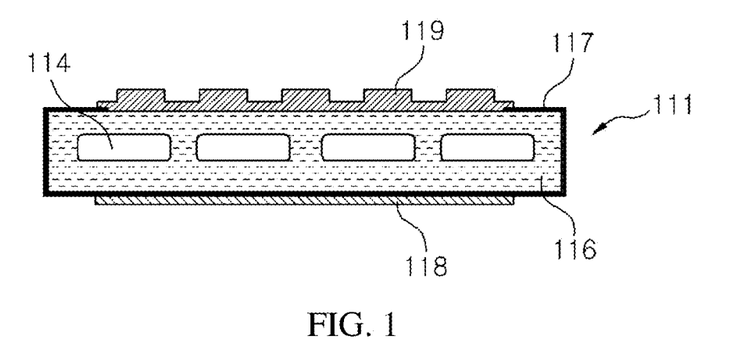
FIG. 1 is a cross-sectional view illustrating a flat tubular unit cell of a solid oxide fuel cell according to an embodiment of the present invention.

FIG. 1 is a cross-sectional view illustrating a flat tubular unit cell of a solid oxide fuel cell according to an embodiment of the present invention.

As illustrated in FIG. 1, a unit cell 111 includes an anode 116 which functions as a support, and a plurality of fuel flow parts 114 positioned approximately at the center thereof. The anode 116 is preferably porous. The anode 116 preferably contains NiO, a mixture of NiO and YSZ (Yttria-stabilized zirconia), a mixture of Ni and YSZ, or a mixture of NiO and GDC (Gd-doped $CeO_2$).

Also, the unit cell 111 includes an electrolyte layer 117 formed thinly on the surface of the anode 116, and a cathode 118 disposed at a predetermined portion of the electrolyte layer 117. Although the formation of the cathode 118 on the lower surface of the anode 116 is illustratively depicted in the drawing, the present invention is not limited thereto. The cathode 118 is preferably porous. The cathode 118 preferably contains LSM or LSC.

Also, the unit cell 111 includes a connection layer 119, which is positioned on the upper surface of the anode 116 and functions to electrically connect a plurality of flat tubular unit cells 111 which are stacked. The connection layer 119 preferably has surface roughness so that air efficiently passes therethrough.

In the present invention, the connection layer 119 includes a first layer and a second layer, wherein i) the first layer contains La-ferrite including one or more selected from the group consisting of Sr, Ca and Ba; and ii) the second layer contains La-ferrite including one or more selected from a group consisting of Sr, Ca and Ba, and one or more cerias selected from a group consisting of GDC (Gd doped ceria), LDC (La-doped ceria) and SDC (Sm-doped ceria). As such, the first layer is in contact with the cathode of each of the unit cells, and the second layer is in contact with the anode of each of the unit cells.

The La-ferrite including one or more selected from the group consisting of Sr, Ca and Ba is $(La_{1-x}Sr_x)FeO_3$, $(La_{1-x}Ca_x)FeO_3$ or $(La_{1-x}Ba_x)FeO_3$, wherein x is preferably 0.05~0.5. The Ca, Sr and Ba are a divalent cation, and have the size similar to that of a $La^{+3}$ ion, and Ca, Sr and Ba are contained in the La-ferrite, thereby improving conductivity of $LaFeO_3$.

The La-ferrite including one or more selected from the group consisting of Sr, Ca and Ba and the one or more cerias selected from the group consisting of GDC (Gd doped ceria), LDC (La-doped ceria) and SDC (Sm-doped ceria) are preferably contained at a weight of 95:5~50:50. When the weight ratio of the La-ferrite including one or more selected from the group consisting of Sr, Ca and Ba and the one or more cerias selected from the group consisting of GDC (Gd doped ceria), LDC (La-doped ceria) and SDC (Sm-doped ceria) falls in the above range, electronic conductivity is superior throughout the connection layer, and resistance is not high, and voltage drop does not occur.

The connection layer 119 includes a first layer and a second layer, whereby it is composed of a dense film and thus gas does not leak, and this layer may be applied densely on a porous electrode. Also, the connection layer does not react with an electrode, and is effective at suppressing the stripping from an electrode during the operation of the fuel cell, and in particular, the connection layer is not stripped from the anode.

Although the thickness of the connection layer 119 is not particularly limited, it is preferably set to 10~50 μm. More specifically, the first layer preferably has a thickness of 2~15 μm, and the second layer preferably has a thickness of 8~35 μm. When the thickness of the connection layer falls in the above range, the connection layer is composed of a dense film, so gas does not leak, and this layer may be applied densely on the porous electrode. Furthermore, the connection layer does not react with the electrode, and is not stripped from the electrode during operation of the fuel cell.

A better understanding of the present invention may be obtained via the following examples and test examples which are set forth to illustrate, but are not to be construed as limiting the present invention.

Example 1 and Comparative Examples 1 and 2

Fabrication of Solid Oxide Fuel Cell

Example 1

Figure 2:
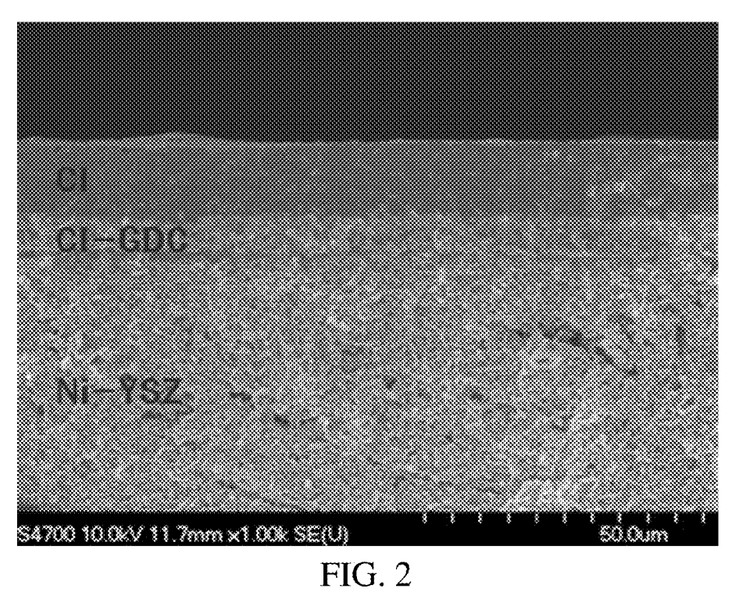
FIGS. 2 to 4 are images illustrating the cross-section of a fuel cell of Example 1.
Figure 3:
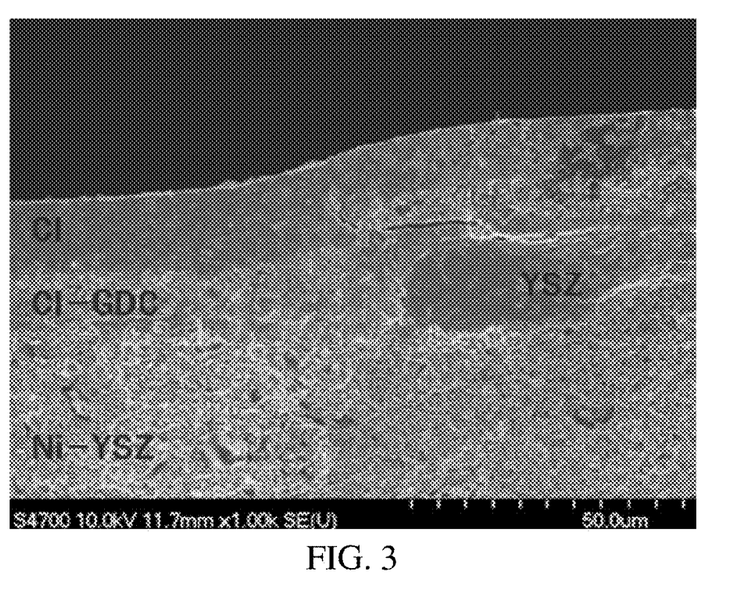
Figure 4:
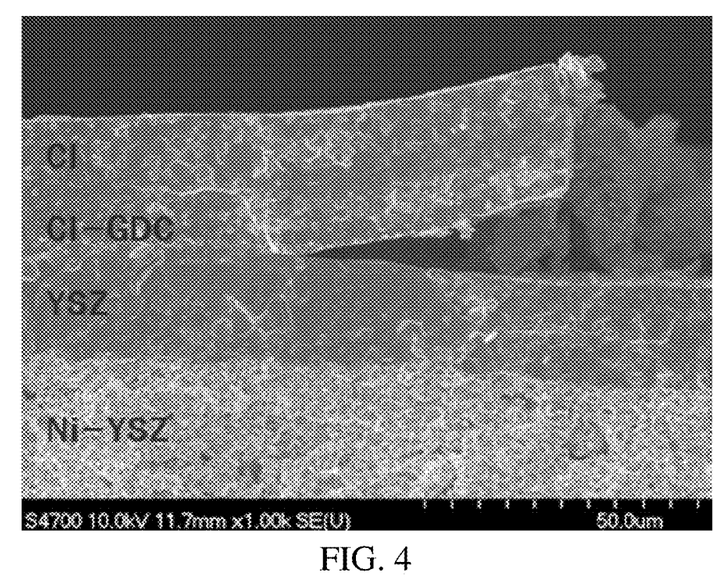

The surface of a flat tubular anode support (Ni-YSZ (Yttria Stabilized Zirconia)) having fuel flow parts was coated with an electrolyte, and thermally treated, thus forming a solid electrolyte layer (YSZ) with a thickness of 20 μm. On the lower surface of the anode support having the solid electrolyte, a cathode containing LSM and YSZ at a weight ratio of 50:50 was formed. On a surface of the anode support on which the cathode was not formed, a connection layer having a two-layer structure was formed. The connection layer was composed of a first layer (CI) containing $La_{0.8}Sr_{0.2}FeO_{3-d}$ (wherein d represented as an unknown value because it varies depending on changes in oxygen concentration at different temperatures) and a second layer (CI-GDC) containing $La_{0.8}Sr_{0.2}FeO_{3-d}$ and GDC (Gd doped ceria). As such, the weight ratio of $La_{0.8}Sr_{0.2}FeO_{3-d}$ and GDC was 6:4. The first layer had a thickness of 15 μm, and the second layer had a thickness of 8 μm. The cross-sections thereof are illustrated in FIGS. 2 to 4. Specifically, FIG. 2 is an image illustrating the cross-section of the portion of the anode support on which the connection layer was formed, and FIGS. 3 and 4 are images illustrating the cross-sections of the portions of the anode support on which the solid electrolyte layer and the connection layer were formed.

Comparative Example 1

Figure 5:
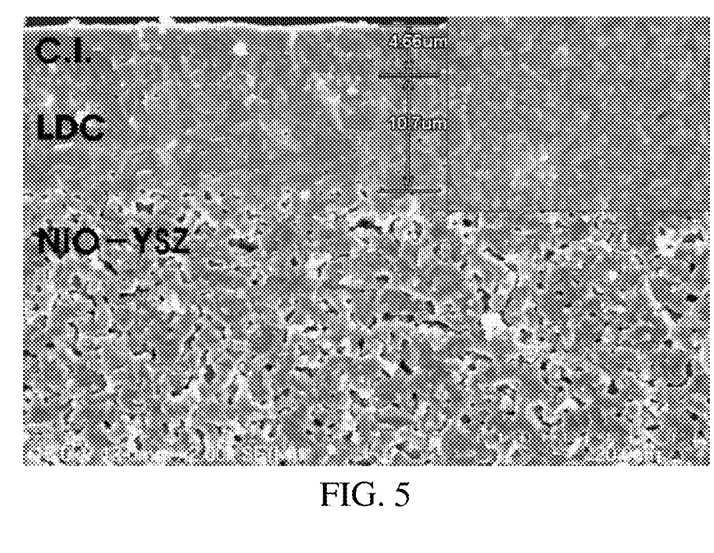
FIG. 5 is an image illustrating the cross-section of a fuel cell of Comparative Example 1.

The surface of a flat tubular anode support (NiO-YSZ) having fuel flow parts was coated with an electrolyte, and thermally treated, thus forming a solid electrolyte layer (YSZ) with a thickness of 20 μm. On the lower surface of the anode support having the solid electrolyte, a cathode containing LSM and YSZ at a weight ratio of 50:50 was formed. On a surface of the anode support on which the cathode was not formed, a connection layer having a two-layer structure was formed. The connection layer was composed of a first layer (CI) containing $La_{0.8}Sr_{0.2}FeO_{3-d}$ (wherein d is represented as an unknown value because it varies depending on changes in oxygen concentration at different temperatures) and a second layer (LDC) containing only LDC (La-doped ceria). The first layer had a thickness of 4.66 μm, and the second layer had a thickness of 10.7 μm. The cross-section thereof is illustrated in FIG. 5.

Comparative Example 2

Figure 6:
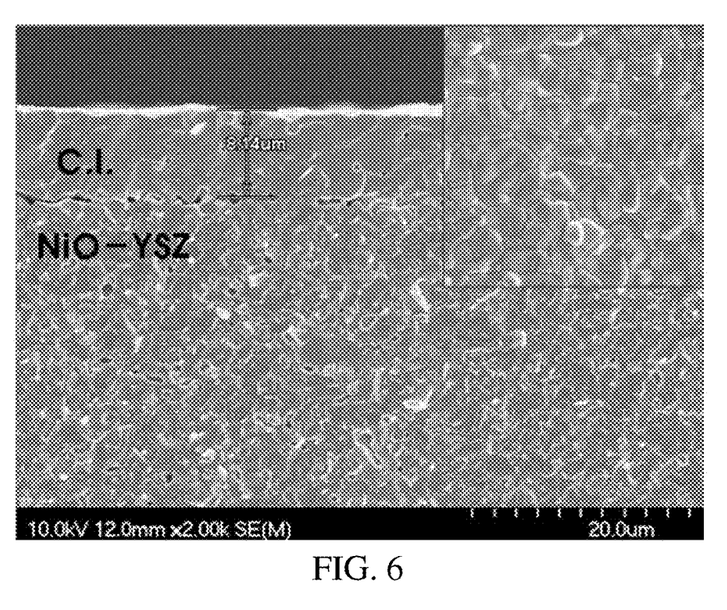
FIG. 6 is an image illustrating the cross-section of a fuel cell of Comparative Example 2.

The surface of a flat tubular anode support (NiO-YSZ) having fuel flow parts was coated with an electrolyte, and thermally treated, thus forming a solid electrolyte layer (YSZ) with a thickness of 20 μm. On the lower surface of the anode support having the solid electrolyte, a cathode containing LSM and YSZ at a weight ratio of 50:50 was formed. On a surface of the anode support on which the cathode was not formed, a connection layer having a single layer structure and containing $La_{0.8}Sr_{0.2}FeO_{3-d}$ (wherein d is represented as an unknown value because it varies depending on changes in oxygen concentration at different temperatures) was formed at a thickness of 8.14 μm (CI). The cross-section thereof is illustrated in FIG. 6.

Test Example

Area Specific Resistance of Connection Layer Applied on Unit Cell

<Evaluation of Area Specific Resistance>

In order to measure the area specific resistance of the connection layer applied on the unit cell, the upper surface of the anode and the connection layer of Example 1 and Comparative Examples 1 and 2 was painted with platinum (Pt), and current was applied to both ends thereof, after which voltage was measured, and area specific resistance was determined from the gradient of the current-voltage curve. As such, to measure the area specific resistance under operation conditions of the fuel cell, hydrogen was fed to the anode, and oxygen was fed to the connection layer.

Figure 7:
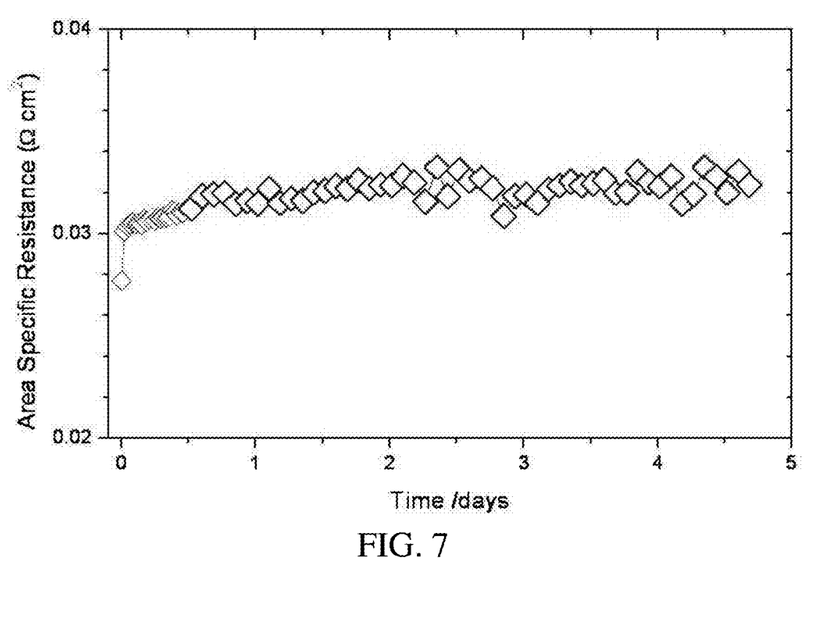
FIG. 7 illustrates results of measurement of area specific resistance of the connection layer of the fuel cell of Example 1.

FIG. 7 illustrates results of measurement of the area specific resistance of the connection layer of the fuel cell of Example 1 at 800° C. for 5 days. The area specific resistance measured for 5 days was very low to the level of about 0.03 $\Omega cm^2$. Compared to 0.2~0.5 $\Omega cm^2$ which is the area specific resistance of the unit cell of a conventional fuel cell, the area specific resistance of the invention is lower, and thus contact resistance between the cells may decrease, ultimately increasing performance of the fuel cell.

Figure 8:
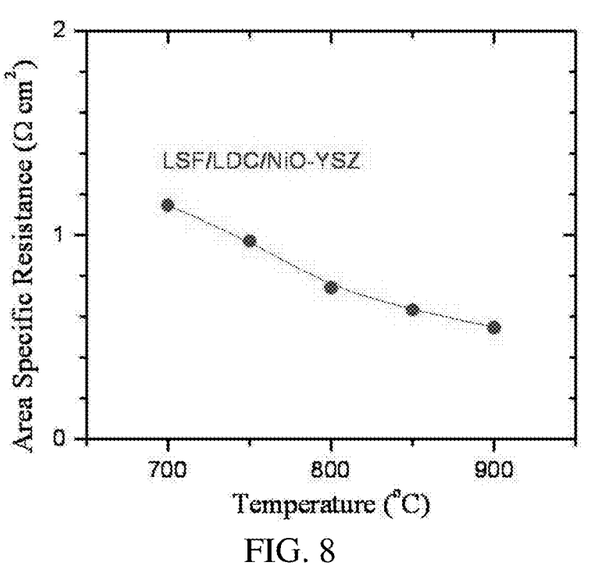
FIG. 8 illustrates results of measurement of area specific resistance of the connection layer of the fuel cell of Comparative Example 1.

FIG. 8 illustrates the area specific resistance of the connection layer of the fuel cell of Comparative Example 1 at different temperatures. The area specific resistance of the above connection layer was 1.2~0.5 $\Omega cm^2$ at 700~900° C. This means that the case where the second layer contains only the LDC layer increases the area specific resistance of the connection layer, undesirably deteriorating performance of the cell.

Figure 9:
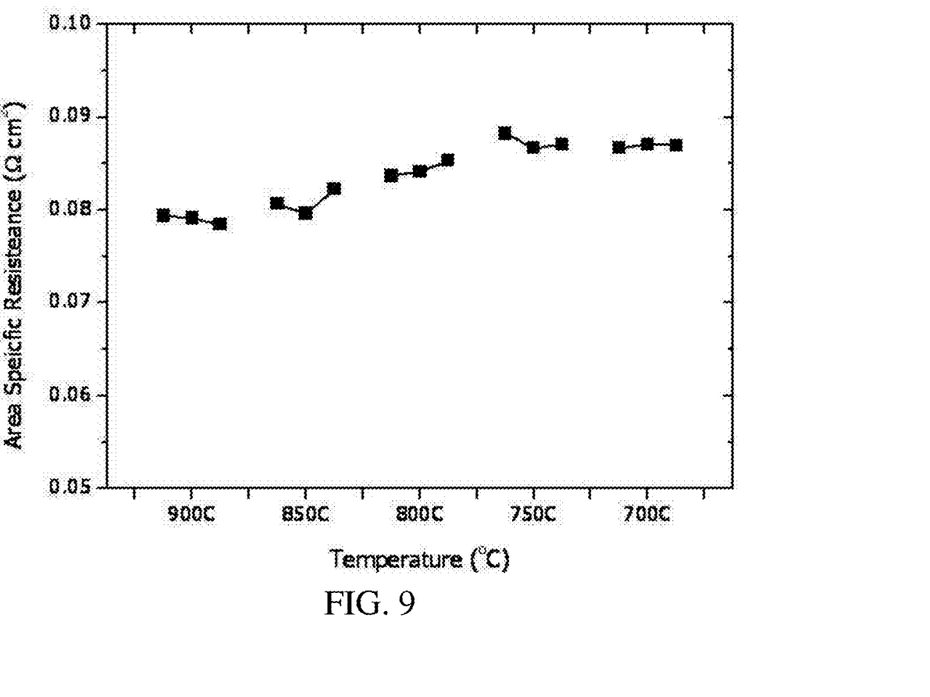
FIG. 9 illustrates results of measurement of area specific resistance of the connection layer of the fuel cell of Comparative Example 2.

FIG. 9 illustrates the area specific resistance of the connection layer of the fuel cell of Comparative Example 2 at different temperatures. The area specific resistance of the above connection layer was 0.08~0.09 $\Omega cm^2$ at 700~900° C. This area specific resistance is higher, compared to the case where the second layer containing GDC is provided as in Example 1. This is considered to be because the second layer is not provided in Comparative Example 2, and thereby the connection layer is partially stripped from the anode layer. Such stripping undesirably deteriorates long-term performance of the unit cell.

What is claimed is:

1. A solid oxide fuel cell, comprising:
   a plurality of unit cells; and
   a connection layer between the plurality of unit cells,
   wherein each of the unit cells comprises:
   an anode;
   a cathode; and
   a solid electrolyte between the anode and the cathode, and
   the connection layer comprises:
   i) a first layer containing La-ferrite including one or more selected from the group consisting of Sr, Ca and Ba; and
   ii) a second layer containing La-ferrite including one or more selected from the group consisting of Sr, Ca and Ba, and one or more cerias selected from the group consisting of GDC (Gd doped ceria), LDC (La-doped ceria) and SDC (Sm-doped ceria),
   wherein the first layer is in contact with the cathode of each of the unit cells, and the second layer is in contact with the anode of each of the unit cells.

2. The solid oxide fuel cell of claim 1, wherein the La-ferrite including one or more selected from the group consisting of Sr, Ca and Ba is $(La_{1-x}Sr_x)FeO_3$, $(La_{1-x}Ca_x)FeO_3$ or $(La_{1-x}Ba_x)FeO_3$, wherein x is 0.05~0.5.

3. The solid oxide fuel cell of claim 1, wherein a weight ratio of the La-ferrite including one or more selected from the group consisting of Sr, Ca and Ba, and the one or more cerias selected from the group consisting of GDC, LDC and SDC, which are contained in the second layer, is 95:5~50:50.

4. The solid oxide fuel cell of claim 1, wherein the anode and the cathode are porous.

* * * * *